(12) United States Patent
Pruitt et al.

(10) Patent No.: US 10,803,240 B2
(45) Date of Patent: Oct. 13, 2020

(54) GENERATION OF DOCUMENT EDITORS HAVING FUNCTIONS SPECIFIED BY ROLE POLICIES

(71) Applicant: OPEN TEXT CORPORATION, Waterloo (CA)

(72) Inventors: Byron Pruitt, Lexington, KY (US); Anthony Wiley, Lexington, KY (US)

(73) Assignee: OPEN TEXT CORPORATION, Watlerloo (CA)

( * ) Notice: Subject to any disclaimer, the term of this patent is extended or adjusted under 35 U.S.C. 154(b) by 0 days.

(21) Appl. No.: 16/666,160

(22) Filed: Oct. 28, 2019

(65) Prior Publication Data

US 2020/0065366 A1   Feb. 27, 2020

Related U.S. Application Data

(63) Continuation of application No. 15/304,411, filed as application No. PCT/US2014/034447 on Apr. 17, 2014, now Pat. No. 10,489,505.

(51) Int. Cl.
*G06F 21/00* (2013.01)
*G06F 40/186* (2020.01)
(Continued)

(52) U.S. Cl.
CPC ............ *G06F 40/186* (2020.01); *G06F 8/10* (2013.01); *G06F 8/20* (2013.01); *G06F 8/33* (2013.01); *G06F 16/986* (2019.01); *G06F 40/166* (2020.01); *G06F 9/4451* (2013.01); *G06F 9/45529* (2013.01)

(58) Field of Classification Search
CPC .................................................. G06F 21/604
See application file for complete search history.

(56) References Cited

U.S. PATENT DOCUMENTS

| 7,877,465 B2 | 1/2011 | Kontamsetty |
| 7,933,952 B2 | 4/2011 | Parker |

(Continued)

FOREIGN PATENT DOCUMENTS

| EP | 1437663 A2 | 7/2014 |
| WO | WO2012125338 A1 | 9/2012 |
| WO | WO2013008238 A1 | 1/2013 |

OTHER PUBLICATIONS

Weinreich, "A Component Framework for Direct-Manipulation Editors" copyright 1998 IEEE, pp. 99-112. (Year: 1998).*

(Continued)

*Primary Examiner* — Amelia L Tapp
(74) *Attorney, Agent, or Firm* — Sprinkle IP Law Group

(57) ABSTRACT

Examples disclosed herein relate to generation of document editors having functions specified by role policies. Examples include acquisition of a request to provide a target user a document editor for a target document type and a determination, in response to the request, of which of a plurality of role policies is associated with the target user based on a role assigned to the target user in an enterprise, wherein each of the role policies is associated with a different role for the enterprise and specifies a different plurality of document editor functions permitted to be included in a document editor for the target document type for a user assigned to the associated role.

18 Claims, 3 Drawing Sheets

(51) Int. Cl.
*G06F 16/958* (2019.01)
*G06F 8/33* (2018.01)
*G06F 40/166* (2020.01)
*G06F 8/10* (2018.01)
*G06F 8/20* (2018.01)
G06F 9/455 (2018.01)
G06F 9/445 (2018.01)

(56) References Cited

U.S. PATENT DOCUMENTS

| | | | |
|---|---|---|---|
| 8,150,820 B1* | 4/2012 | Herbach | G06F 21/604 |
| | | | 707/705 |
| 8,555,150 B1 | 10/2013 | Ortmanns et al. | |
| 8,769,063 B2 | 7/2014 | Barton | |
| 8,997,246 B2 | 3/2015 | Grinstein | |
| 9,654,351 B2 | 5/2017 | Seago | |
| 1,048,950 A1 | 11/2019 | Pruitt et al. | |
| 2005/0102612 A1 | 5/2005 | Allan | |
| 2005/0144230 A1* | 6/2005 | Russo | G06F 21/604 |
| | | | 709/204 |
| 2007/0180490 A1* | 8/2007 | Renzi | H04L 63/145 |
| | | | 726/1 |
| 2007/0220417 A1 | 9/2007 | Mathew | |
| 2008/0083027 A1 | 4/2008 | Freiman | |
| 2008/0307415 A1 | 12/2008 | Carter | |
| 2012/0102383 A1 | 4/2012 | Liu | |
| 2014/0201242 A1* | 7/2014 | Bakthavachalam | G06F 21/604 |
| | | | 707/785 |
| 2015/0128249 A1 | 5/2015 | Alexandrian et al. | |
| 2017/0039180 A1 | 2/2017 | Pruitt et al. | |

OTHER PUBLICATIONS

Li et al., "Using Familiar Single-User Editors for Collaborative Editing" Proceedings of the 36th Hawaii International Conference on System Sciences (HICSS'03), copyright 2002 IEEE, 10 pages. (Year: 2002).*

International Search Report issued for PCT Application No. PCT/US2014/034447 dated Jan. 26, 2016, 3 pages.

International Preliminary Report on Patentability issued for PCT Application No. PCT/US2014/034447, dated Oct. 27, 2016, 8 pages.

European Search Report issued for European Patent Application No. 14889484.3, dated Nov. 15, 2017, 7 pages.

Office Action for U.S. Appl. No. 15/304,411, dated Sep. 26, 2017, 24 pages.

Brustoloni et al., "Evaluating the Usability of Usage Controls in Electronic Collaboration", Symposium on Usable Privacy and Security (SOUPS) 2008, Jul. 23-25, 2008, Pittsburgh, PA, 8 pages.

Office Action for U.S. Appl. No. 15/304,411, dated Apr. 19, 2018, 25 pages.

Notice of Allowance for U.S. Appl. No. 15/304,411, dated Oct. 4, 2018, 6 pages.

Notice of Allowance for U.S. Appl. No. 15/304,411, dated Jul. 26, 2019, 11 pages.

Office Action issued for European Patent Application No. 14889484.3, dated Nov. 6, 2019, 4 pages.

* cited by examiner

GENERATION OF DOCUMENT EDITORS HAVING FUNCTIONS SPECIFIED BY ROLE POLICIES

CROSS-REFERENCE TO RELATED APPLICATION

This application is a continuation of, and claims a benefit of priority under 35 U.S.C. 120 of the filing date of U.S. patent application Ser. No. 15/304,411, filed Oct. 14, 2016, entitled "GENERATION OF DOCUMENT EDITORS HAVING FUNCTIONS SPECIFIED BY ROLE POLICIES," which is a national stage application of and claims priority to International Application No. PCT/US2014/034447, filed Apr. 17, 2014, entitled "GENERATION OF DOCUMENT EDITORS HAVING FUNCTIONS SPECIFIED BY ROLE POLICIES," the entire contents of which are hereby expressly incorporated by reference for all purposes.

BACKGROUND

A document editor may be a computer application executable by a computing device to create, view, and modify (or edit) digital content (e.g., text, image(s), tables, charts, spreadsheets, etc., or a combination thereof) included in a digital document. In some cases, a document editor application may be a static application installed on a computing device for use with a plurality of documents (or files) stored on the computing device, and may implement a large collection of functions that enable a user to perform a wide variety of actions on the files.

BRIEF DESCRIPTION OF THE DRAWINGS

The following detailed description references the drawings, wherein.

DETAILED DESCRIPTION

Figure 1:
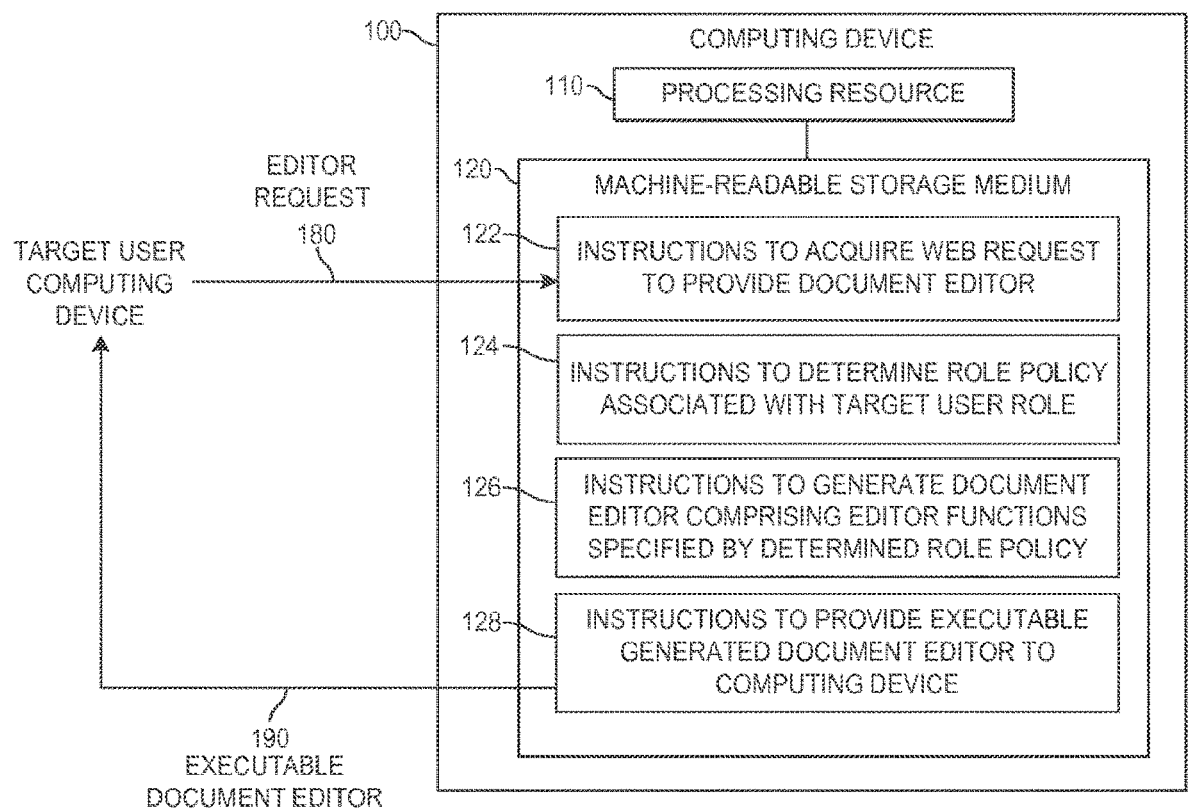
FIG. 1 is a block diagram of an example computing device to generate a document editor comprising document editor functions specified by a determined role policy.

As used herein, a "document editor" (or "document editor application") is a computer application executable by a computing device to perform at least one of function(s) to create, view, and modify (or edit) digital content (e.g., text, image(s), tables, charts, spreadsheets, etc., or a combination thereof) included in a digital file. A digital file including such digital content may be referred to herein as a "document". In some cases, a single version of a document editor may be provided for many different users who may each install the document editor application onto their respective computing devices. For example, the single version may be provided to each user of a computing device having a particular operating system (OS). However, as described below, such static document editor applications may have various complexities associated with them.

For example, given the variety of different functions that may be desired by various potential users of such a document editor application, the application may implement a large collection of functions that may enable a user to perform a wide variety of actions on a document. However, any particular user may only utilize a small subset of the available functions. For such users, the presence of many unused or irrelevant functions in the document editor may increase the difficulty and frustration of using the document editor.

As another example, the document editor application may remain static on a given computing device unless updates to the application (e.g., critical error fixes, security updates, etc.) are installed. In such cases, the document editor may include functionalities to manage the process of acquiring such updates, such as detecting the availability of new updates or versions, informing the user of this availability, and managing the installation of the updates or new versions. These update processes may include inconvenient disruptions for a user.

In some examples, implementing information rights management (IRM) with such a static document editor may be difficult. For example, user profiles and documents themselves may constrain the rights of users to take certain actions (e.g., document storage, printing, sharing, etc.) with respect to the documents. In some examples, a static document editor may determine specific rights for particular users using a combination of built-in enforcement mechanisms and remote resources of a computer network, while still remaining vulnerable to illegal actions to circumvent the enforcement mechanisms.

Also, in some examples, different versions of a given document editor application may be created and maintained for different types of devices, operating systems, and the like, which may contribute to the difficulty in creating and supporting a document editor.

To address these issues, examples described herein may, in response to a web request from a user, dynamically generate and provide to the user a document editor including functions permitted for the user based on the user's role in an enterprise. Some examples described herein may acquire, from a computing device of a target user, a request to provide the target user a document editor for a target document type and, in response to the request, determine which of a plurality of role policies is associated with the target user based on a role assigned to the target user in an enterprise. In such examples, each of the role policies may be associated with a different role for the enterprise and may specify a different plurality of document editor functions permitted to be included in a document editor for the target document type when requested by a user assigned to the associated role. Some examples described herein may further generate the document editor comprising at least some of the document editor functions specified by the determined role policy and excluding document editor functions of another of the role policies that are excluded from the determined role policy, and provide the generated document editor to the computing device for execution.

In this manner, examples described herein may provide document editors that are dynamically tailored to individual users based on user roles in an enterprise to more seamlessly implement administrative control of what actions individual users may take with regard to a particular type of document. Examples described herein may also more seamlessly update document editors, as each document editor may be dynamically constructed with the most up-to-date features at each request. Additionally, examples described herein may reduce feature clutter in a document editor user interface at least by limiting the functions available to a user based on role policies.

Referring now to the drawings, FIG. 1 is a block diagram of an example computing device 100 to generate a document editor 190 comprising document editor functions specified by a determined role policy. In the example of FIG. 1, computing device 100 includes a processing resource 110 and a machine-readable storage medium 120 comprising (e.g., encoded with) instructions 122, 124, 126, and 128 executable by processing resource 110. In some examples, storage medium 120 may include additional instructions. In some examples, instructions 122, 124, 126, and 128, and any other instructions described herein in relation to storage medium 120, may be stored on a machine-readable storage medium remote from but accessible to computing device 100 and processing resource 110 (e.g., via a computer network). In some examples, instructions 122, 124, 126, and 128 may be instructions of a computer program, computer application ("app"), agent, or the like, of computing device 100. In other examples, the functionalities described herein in relation to instructions 122, 124, 126, and 128 may be implemented as engines comprising any combination of hardware and programming to implement the functionalities of the engines, as described below.

As used herein, a "computing device" may be a desktop computer, laptop (or notebook) computer, workstation, tablet computer, mobile phone, smart device, server, blade enclosure, or any other processing device or equipment. In examples described herein, a processing resource may include, for example, one processor or multiple processors included in a single computing device (as shown in FIG. 1) or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution of instructions stored on a machine-readable storage medium, or a combination thereof. Processing resource 110 may fetch, decode, and execute instructions stored on storage medium 120 to perform the functionalities described below. In other examples, the functionalities of any of the instructions of storage medium 120 may be implemented in the form of electronic circuitry, in the form of executable instructions encoded on a machine-readable storage medium, or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory.

In the example of FIG. 1, instructions 122 may actively acquire (e.g., retrieve, etc.) or passively acquire (e.g., receive, etc.), from a computing device of a target user, a request 180 to provide the target user a document editor for a target document type. In examples described herein, the computing device of the target user may be remote from computing device 100. In examples described herein, first computing device that is "remote" from a second computing device may be a first computing device that is separate from, and not directly connected to, the second computing device, wherein the first and second computing devices may access one another over a computer network. As used herein, a computer network may include, for example, a local area network (LAN), a wireless local area network (WLAN), a virtual private network (VPN), the Internet, or the like, or a combination thereof. In some examples, a computer network may include a telephone network (e.g., a cellular telephone network).

In the example of FIG. 1, instructions 122 may acquire request 180 from the computing device of the target user via a computer network. In examples described herein, request 180 may be any suitable type of message requesting that the target user be provided a document editor for the target document type. For example, request 180 may be a web request (i.e., web request 180). As used herein, a "web request" may be any type of request formatted according to a protocol for communication over the Internet. For example, a web request may be a universal resource locator (URL)-based request, such as a hypertext transfer protocol (HTTP) request. In some examples, web request 180 may be an HTTP request. Web request 180 may be an HTTP request including a URL specifying various parameters of the request. For example, the URL may be structured according to a representational state transfer (REST) style.

For example, web request 180 may comprise a URL formatted like "https://www.example.com:1111/BusinessApp/edit/document/1234," including parameters specifying a host domain (e.g., "www.example.com"), a port (e.g., "1111"), an application to receive the request (e.g., "BusinessApp"), a request to provide a document editor (e.g., "edit"), a document is being specified (e.g., "document"), and a particular document to edit (e.g., the document identified by the identifier "1234"). The above is one example format shown with example parameters. In other examples, other URL formats and parameters may be used. In some examples, in addition to a URL, web request 180 may comprise additional information, such as header(s). In some examples, such header(s) may, for example, identify the target user (e.g., the target user that sent the request), identify the computing device used to send request 180 (e.g., the computing device of the target user), or any other suitable information, or a combination thereof. In such example, users, computing devices, and the like may be specified in any suitable manner, such as with identifiers assigned to the users, computing devices, and the like.

In the example of FIG. 1, request 180, which is a request to provide the target user with a document editor, may (directly or indirectly) identify the target user, a document (of the target document type) to be edited in the document editor, and a computing device type of the computing device of the target user. For example, request 180 may be a web request 180 and may comprise a URL requesting to provide a document editor to the target user for a document identified in the URL, and may further comprise headers identifying the target user and the computing device type of the computing device of the target user. In some examples, web request 180 may be generated by a web browser of (e.g., executing on) the computing device of the target user. In other examples, request 180 may be any other suitable type of request or message.

As noted above, in the example of FIG. 1, instructions 122 may actively or passively acquire, from a computing device of a target user, a request 180 to provide the target user a document editor for a target document type. Request 180 may specify the request to provide a document editor to the target user in any manner consistent with the example described above, or in any other suitable manner. In some examples, request 180 may indirectly identify the target document type by, for example, specifying a particular document, as described in the example above. In such examples, the target document type may be the document type of the particular document specified in request 130.

In examples described herein, documents of a particular "document type" are documents that store digital content (or data) in the same file format, and according to the same document type definition (if any). In examples described herein, documents storing digital content according to different document type definitions (DTDs) are not documents of the same document type. In examples in which none of a plurality of documents store digital content according to any document type definition (DTD), the documents are of the same document type when they store digital content in the same file format. Documents storing digital content in different file formats are considered documents of different document types. In examples described here, documents of the same file format may use the same filename extension (e.g., ".html", ".gif", ".txt", etc.).

In the example of FIG. 1, computing device 100 may have access to information regarding a plurality of roles defined for an enterprise. In examples described herein, an enterprise may be a corporation, company, organization, or other entity having an information technology (IT) infrastructure for use by users associated with the entity, such as employees, officers, members, partners, principles, or guests of the entity, or the like, or a combination thereof. Such an enterprise may control access to various resources within the IT infrastructure by assigning individual users to different roles in the enterprise, wherein each role is associated with a set of access control permissions that (alone or in combination with other information) indicate whether a user associated with the role is permitted to perform certain action(s), access certain resource(s), etc., within the IT infrastructure. In some examples, different roles may be associated with different sets of access control permissions, such that users assigned to different roles may have different permissions for performing certain actions, accessing certain resources, etc., within the enterprise.

In the example of FIG. 1, computing device 100 may have access to a plurality of role policies for the enterprise. In some examples, the role policies may be stored in one or more repositories that may be included in or remote from but accessible to computing device 100, or a combination thereof. Each role policy of the plurality of role policies may be associated with a different role for the enterprise and may specify a different plurality of document editor functions permitted to be included in a document editor for the target document type when requested by a user assigned to the associated role. The associations between roles and role policies may be represented and stored in any suitable format (e.g., a mapping, etc.) on or remote from but accessible to computing device 100, or a combination thereof. Each role policy may specify permitted document editor functions in any suitable form (e.g., a list, a non-empty set, etc.).

In examples described herein, a "function" of a document editor may refer to any action, process, or other functionality that may be performed by a document editor in relation to a document. Example document editor functions include functions such as, for example, document editing (e.g., adding, removing, replacing, or modifying content, or the like), saving, printing, viewing, formatting, sharing (e.g., e-mailing), and the like. Some document-editor functions may be user-facing (e.g., user-accessible save and print functions, etc.), and may be triggered via a graphical user interface (GUI) object of a document editor, such as a button, menu item, or the like. Other functions may not be user-facing (e.g., content serialization, etc.), and may not be directly triggered by a GUI object of a document editor. In some examples, a non-user facing feature may be performed as part of a larger process to perform a user-facing function. As described in more detail below, a document editor function may be implemented by information including machine-readable instructions (e.g., programming code), which may include one or more subroutines or portions thereof. However, the term "function" as used herein is not to be equated with the concept of a "subroutine".

As an example of different role policies associated with different roles, a first role policy associated with a first role may specify a plurality of document editor functions including a local document save function and a print function, a second role policy associated with a second role may specify a plurality of document editor functions including the print function but excluding the local document save function, and a third role policy associated with a third role may specify a plurality of document editor functions that does not include either the print function or the local document save function. In this example, the first, second and third roles are different roles in the enterprise. In such examples, examples described herein may permit the print and local save functions to be included in a document editor dynamically generated for a user assigned to the first role, permit the print function (but not the local save function) to be included in a document editor dynamically generated for a user assigned to the second role, and permit neither the print function nor the local save function to be included in a document editor dynamically generated for a user assigned to the third role. In this manner, examples described herein may control what functions users have access to in dynamically generated document editors, based on the respective roles of the users in an enterprise.

In the example of FIG. 1, in response to request 180, instructions 124 may determine which role policy of the plurality of role policies is associated with the target user based on a role assigned to the target user in an enterprise. For example, in response to request 180, instructions 124 may use an identifier for the target user e.g., included in request 180) to determine a role in the enterprise to which the target user is assigned, and then determine which of the plurality of role policies is associated with the determined role, and thereby associated with the target user. The determined role policy for the target user may specify a plurality of document editor functions permitted to be included in a document editor for the target document type when requested by a user assigned to the determined role, such as the target user in this example.

In the example of FIG. 1, instructions 126 may generate a document editor 190 comprising at least some of the document editor functions specified by the determined role policy that are excluded from the determined role policy but specified by at least one other role policy of the plurality of role policies. For example, based on document editor functions specified by the determined role policy and other considerations described in more detail below, instructions 124 may determine a target plurality of the document editor functions which is a non-empty subset of document editor functions specified by the determined role policy. In such examples, the target plurality of document editor functions includes fewer than all of the document editor functions specified by the determined role policy, but does not include document editor functions not specified by the determined role policy. In such examples, instructions 126 may generate a document editor 190 comprising the target plurality of document editor functions from among the document editor functions specified by the determined role policy.

In examples described herein, each document editor function may be implemented by a respective collection of information including at least one of machine-readable instructions (e.g. JAVASCRIPT code, etc.), HTML code (e.g., information structured according to HTML, etc.), and style sheet information (e.g., information structured according to a style sheet language, such as cascading style sheet (CSS), etc.). In examples described herein, document editor functions included in each document editor generated for a particular computing device type and document type may be considered "core" document editor functions for the particular computing device type and document type. In examples described herein, document editor functions that are not core document editor functions, but may be selectively specified for inclusion in or exclusion from a dynamically generated document editor by various policies (e.g., role policies, device policies) and profiles (e.g., user profiles) as described herein, may be referred to herein as "configurable" document editor functions.

In such examples, instructions 128 may access the implementing information for each of the configurable document editor functions determined for inclusion in document editor 190, and implementing information for core document editor functions for the specified computing device type and document type (e.g., as indicated by request 180), and may dynamically assemble together the accessed implementing information for the core and configurable document editor functions to generate an executable document editor 190 including the document editor functions determined for inclusion in document editor 190 and excluding (configurable) document editor functions that are excluded from the determined role policy but are included in at least one other role policy of the plurality of role policies.

In examples described herein, configurable document editor functions not specified by a given role policy (as functions permitted to be included in a document editor) are not permitted to be included in a document editor for the target document type when requested by a user assigned to the role associated with the given role policy. In such examples, the document editor functions not specified may be excluded (or prevented from inclusion) in the document editor requested by the user. Such exclusion may be performed by instructions 126, for example. In such examples, instructions 126 may generate a document editor 190 comprising the target plurality of document editor functions specified by the determined role policy, and excluding configurable document editor functions excluded from the determined role policy.

In some examples, instructions 126 may generate document editor 190 such that it is executable by the computing device of the target user. For example, instructions 126 may generate document editor 190 such that it is executable by a web browser of the computing device of the target user. In examples described herein, a dynamically generated document editor (e.g., document editor 190), when executed on a computing device of a target user, may present (e.g., display) a GUI through which the document editor may receive input from the target user to perform various editing actions on a document open in the document editor (such as the document specified in request 180 in the example of FIG. 1). In some examples, the GUI of document editor 190 may display a print view of the document open in document editor 190. In examples described herein, a "print view" of a document is a view of the document, or any portion thereof, as the document (or the displayed portion) is to appear when printed. For example, the print view may be a view of the document (or a portion thereof) as the document is to appear in a final form as the document is to be presented to an end recipient of the document. In such examples, the document editor may receive and respond to user input performed, via the GUI, on the document (or digital content thereof) while displayed in a print view. In such examples, document editor 190 may enable the target user to perform actions (e.g., one or more of adding, removing, replacing, or modifying content, etc.) on the document in the print view directly and in a user-directed manner, without an intervening set of input forms, set of dialog boxes, or the like, to receive user input for the document and separating the user from performing actions directly on the document in print view.

After document editor 190 is generated, instructions 128 may provide the generated document editor 190 to the computing device of the target user. In some examples, instructions 128 may provide document editor 190 to the computing device of the target user over a computer network (e.g., the Internet).

As noted above, in some examples, request 180 may identify the target user, a document of the target document type to be edited in the document editor, and a computing device type of the computing device of the target user. In examples described herein, a "computing device type" represents a class of computing devices sharing particular characteristic(s), attribute(s), or the like. In some examples, computing device types may be relatively high-level classifications of a category of computing device. For example, personal computers (PCs) of various types (e.g., laptop computers, desktop computers, etc.) may be considered computing devices of a first computing device type, tablet computers of various kinds may be considered computing devices of a second computing device type, and smart devices (e.g., smartphones, etc.) of various kinds may be considered computing devices of a third computing device type. Other examples may include more computing device types with more fine-grained classifications, further distinguishing between computing devices on the basis of other attributes, such as type of operating system type, etc.

In some examples, computing device 100 may further have access to a plurality of device policies for the enterprise. In some examples, the device policies may be stored in one or more repositories that may be included in or remote from but accessible to computing device 100, or a combination thereof. In such examples, each device policy of the plurality of device policies may be associated with a different computing device type and may specify a different plurality of document editor functions permitted to be included in a document editor for the target document type when generated for a computing device of the associated computing device type. The associations between computing device types and device policies may be represented and stored in any suitable format (e.g., a mapping, etc.) on or remote from but accessible to computing device 100, or a combination thereof. Each device policy may specify permitted document editor functions in any suitable form (e.g., a list, a non-empty set, etc.). In examples described herein, configurable document editor functions not specified by a given device policy as permitted to be included in a document editor are not permitted to be included in a document editor requested in relation to a computing device type associated with the given device policy (e.g., when the computing device type is indicated in the request for the document editor). In such examples, the document editor functions not specified may be excluded (or prevented from inclusion) in the document editor requested by the user. Such exclusion may be performed by instructions 126, for example.

In some examples, in response to request 180, instructions 124 may determine a plurality of document editor functions permitted in a document editor for the specified computing device type and the target document type by determining which of a plurality of device policies is associated with the identified computing device type in the enterprise using information of request 180 identifying the computing device type of the computing device of the target user. In such examples, the determined device policy may specify a plurality of document editor functions permitted to be included in a document editor for a computing device of the identified computing device type. For example, when the identified computing device type is a personal computer (PC) computing device type, then the determined device policy may specify various document editor functions (e.g., saving, printing, etc.) that are permitted to be included in a document editor for a PC, such as a desktop or laptop computer, for example. The device policy may also exclude document editor functions not permitted to be included in a document editor for a PC, though at least one of such document editor functions may be included in other device polic(ies) for other device types (e.g., tablet, smartphone, etc.).

In the example of FIG. 1, the plurality of document editor functions specified by the determined role policy may be considered a first plurality of document editor functions, and the plurality of document editor functions specified by the determined device policy may be considered a second plurality of document editor functions. In such examples, instructions 126 may generate document editor 190 such that document editor 190 comprises third plurality of document editor functions that are included in both the first and second pluralities of document editor functions, and that excludes document editor functions specified by other role or device policies but not specified by both determined policies (i.e., specified in both the first and second pluralities of document editor functions). In such examples, instructions 126 may generate document editor 190 such that it comprises document editor functions common to both the first and second pluralities of document editor functions, and excludes configurable document editor functions excluded from either (or both) of the first and second pluralities of functions (i.e., excluded from either the determined role policy and the determined device policy). In some examples, instructions 126 may determine an intersection of the first and second pluralities of functions, and some or all of the resulting functions may be determined as the third plurality of document editor functions.

In some examples, computing device 100 may further have access to a plurality of user profiles for the enterprise. In some examples, the user profiles may be stored in one or more repositories that may be included in or remote from but accessible to computing device 100, or a combination thereof. In such examples, each user profile of the plurality of user profiles may be associated with a different user in the enterprise and may specify a respective plurality of document editor functions to be excluded from any document editor for the target document type generated for the user. The associations between users and user profiles may be represented and stored in any suitable format (e.g., a mapping, etc.) on or remote from but accessible to computing device 100, or a combination thereof. Each user profile may specify functions in any suitable form (e.g., a list, a non-empty set, etc.).

In some examples, instructions 124 may determine a fourth plurality of document editor functions to be excluded from a document editor for the target document type when generated for the target user. For example, in response to request 180, instructions 124 may determine a user profile associated with the user identified in request 180, the user profile specifying the fourth plurality of document editor functions to be excluded from a document editor for the target document type when generated for the target user.

In such examples, instructions 126 may generate document editor 190 excluding the functions of the fourth plurality of document editor functions, and including the document editor functions otherwise determined by instructions 124. In some examples, instructions 124 may determine the third plurality of document editor functions such that it includes document editor functions that are included in both the first and second pluralities of document editor functions, and excludes each document editor function included in the fourth plurality of document editor functions (e.g., included in the determined user profile). In such examples, instructions 126 may generate document editor 190 comprising the functions of the third plurality of document editor functions, and excluding configurable document editor functions not specified in (i.e., excluded from) the third plurality. In other examples, the user profile may instead specify document editor functions to be included in a document editor, and instructions 126 may account for the functions of the user profile accordingly. In examples described herein, the user profiles may enable users to customize the dynamically generated document editors they will receive by specifying functions to exclude, for example. In this manner, examples described herein may further reduce feature clutter in document editors.

In some examples, instructions 122, 124, 126, and 128 may be part of an installation package that, when installed, may be executed by processing resource 110 to implement the functionalities described herein in relation to instructions 122, 124, 126, and 128. In such examples, storage medium 120 may be a portable medium, such as a CD, DVD, or flash drive, or a memory maintained by a server from which the installation package can be downloaded and installed. In other examples, instructions 122, 124, 126, and 128 may be part of an application, applications, or component already installed on remote printing server 100 including processing resource 110. In such examples, the storage medium 120 may include memory such as a hard drive, solid state drive, or the like. In some examples, functionalities described herein in relation to FIG. 1 may be provided in combination with functionalities described herein in relation to any of FIGS. 2-4.

Figure 2:
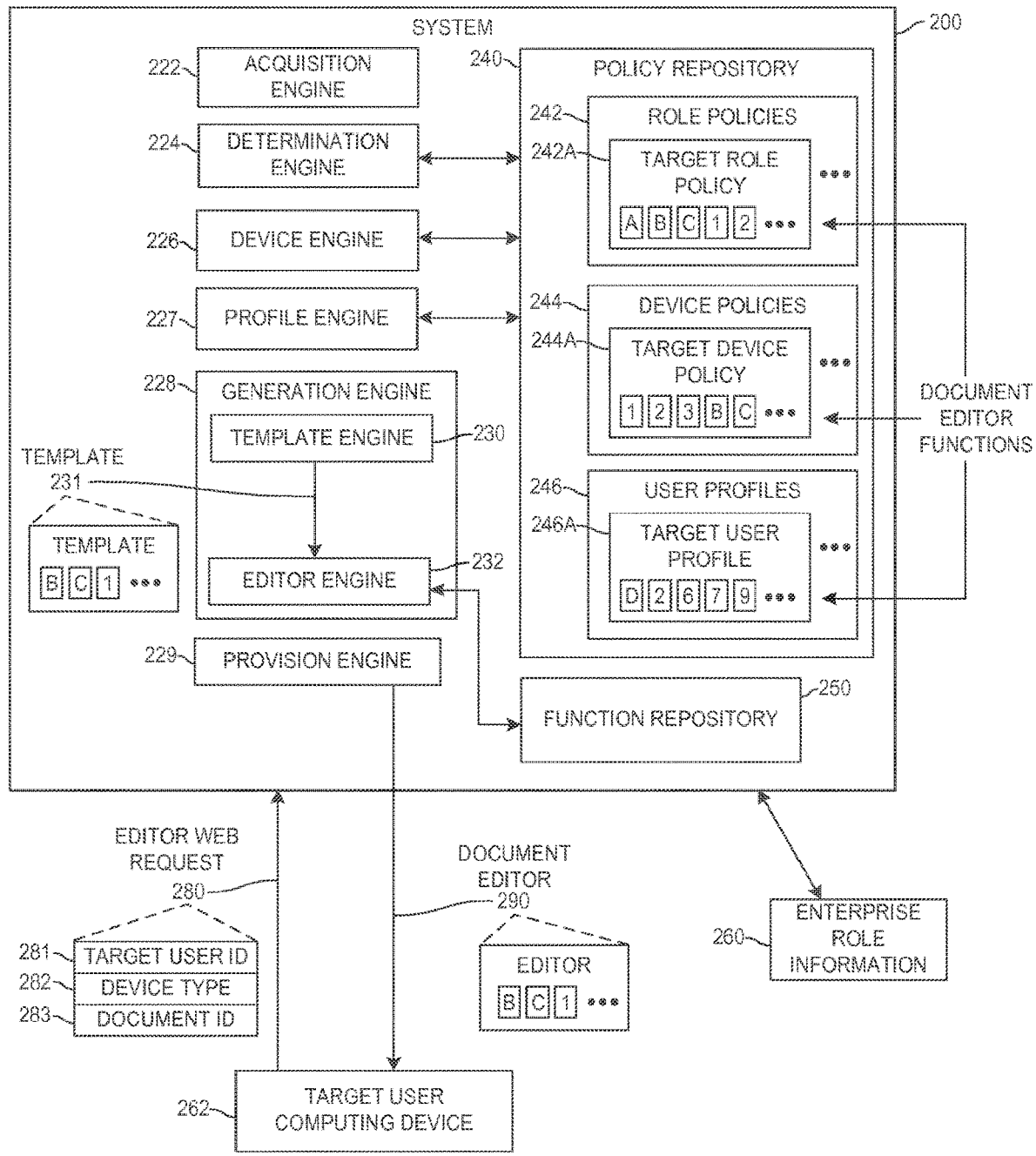
FIG. 2 is a block diagram of an example system to provide a generated document editor to a computing device of a target user.

FIG. 2 is a block diagram of an example system 200 to provide a generated document editor 290 to a computing device 262 of a target user. System 200 and computing device 262 may be remote from one another and may communicate with one another via a computer network (e.g., the Internet). In the example of FIG. 2, system 200 includes at least engines 222, 224, 226-229, 230, and 232, which may be any combination of hardware and programming to implement the functionalities of the engines. In examples described herein, such combinations of hardware and programming may be implemented in a number of different ways. For example, the programming for the engines may be processor executable instructions stored on a non-transitory machine-readable storage medium and the hardware for the engines may include a processing resource to execute those instructions. In such examples, the machine-readable storage medium may store instructions that, when executed by the processing resource, implement engines 222, 224, 226-229, 230, and 232. In such examples, system 200 may include the machine-readable storage medium storing the instructions and the processing resource to execute the instructions, or the machine-readable storage medium may be separate but accessible to system 200 and the processing resource.

In some examples, the instructions can be part of an installation package that, when installed, can be executed by the processing resource to implement at least engines 222, 224, 226-229, 230, and 232. In such examples, the machine-readable storage medium may be a portable medium, such as a CD, DVD, or flash drive, or a memory maintained by a server from which the installation package can be downloaded and installed. In other examples, the instructions may be part of an application, applications, or component already installed on system 200 including the processing resource. In such examples, the machine-readable storage medium may include memory such as a hard drive, solid state drive, or the like. In other examples, the functionalities of any engines of system 200 may be implemented in the form of electronic circuitry.

In the example of FIG. 2, acquisition engine 222 may actively or passively acquire a request 280 to provide a specified target user a document editor for a target document type and a specified computing device type. In the example of FIG. 2, request 230 may include information 281 specifying a target user, such as an identifier for the target user. Request 280 may further include information 282 directly or indirectly specifying a computing device type of computing device 262 of the target user, and information 283 (e.g., a document identifier) specifying a document of the target document type to be edited in the requested document editor. In some examples, request 280 may indirectly specify the target document type by, for example, specifying the particular document to be edited, as described above. In examples described herein, request 280 may be any suitable request as described above in relation to request 180 of FIG. 1, and information 281-283 may be specified in request 280 in any suitable manner described above in relation to FIG. 1, for example. In some examples, request 230 may be a web request, as described above. For example, a web request 230 may comprise a hypertext transfer protocol (HTTP) request.

In the example of FIG. 2, system 200 comprises a policy repository 240 to store a plurality of role policies 242, a plurality of device policies 244, and a plurality of user profiles 246. Policy repository 240 may be implemented by at least one machine-readable storage medium. In other examples, policy repository 240 may be remote from but accessible to system 200 (e.g., via a computer network). System 200 may also have access to information 260 regarding a plurality of roles defined for an enterprise, as described above in relation to computing device 100 of FIG. 1. Such information 260 may be stored in a repository in or remote from but accessible to system 200 (or a combination thereof) and the information may include information regarding assignment of enterprise users to roles in the enterprise.

In the example of FIG. 2, each role policy of the plurality of role policies 242 may be associated with a different role for the enterprise and may specify a different plurality of document editor functions permitted to be included in a document editor for the target document type when requested by a user assigned to the associated role. Although one role policy 242A is illustrated in the example of FIG. 2, the plurality of role policies 242 may include other user profiles. The associations between roles and role policies may be represented and stored in any suitable format (e.g., a mapping, etc.) on or remote from but accessible to system 200, or a combination thereof. Each role policy may specify permitted document editor functions in any suitable form (e.g., a list, a non-empty set, etc.). In examples described herein, configurable document editor functions not specified by a given role policy as permitted to be included in a document editor are not permitted to be included in a document editor for the target document type when requested by a user assigned to the role associated with the given role policy. In such examples, the document editor functions not specified may be excluded (or prevented from inclusion) in the document editor requested by the user. Such exclusion may be performed by engine 228, for example.

In the example of FIG. 2, determination engine 224 may determine, in response to request 280 and based on a role assigned to the target user in an enterprise, a target role policy 242A for the target user among the plurality of role policies 242. Target role policy 242A may specify a first plurality of document editor functions (e.g., configurable document editor functions) represented in FIG. 2 by functions labeled "A", "B", "C", "1", and "2". In some examples, the target role policy 242A may specify more or fewer document editor functions. Engine 224 may determine the role assigned to the target user based on target user information 281 of request 280 and enterprise role information 260.

In some examples, engine 228 may generate the document editor 290 comprising at least some of the document editor functions specified by target role policy 242A, and excluding configurable document editor functions that are excluded from target role policy 242A (but which may be specified in at least one other role policy of the plurality of role policies 242).

As noted above, policy repository 240 may include a plurality of device policies 244. In such examples, each device policy of the plurality of device policies 244 may be associated with a different computing device type and may specify a different plurality of document editor functions permitted to be included in a document editor for the target document type when generated for a computing device of the associated computing device type. Although one device policy 244A is illustrated in the example of FIG. 2, the plurality of device policies 244 may include other user profiles. The associations between computing device types and device policies may be represented and stored in any suitable format (e.g., a mapping, etc.) on or remote from but accessible to computing device 100, or a combination thereof. Each device policy may specify permitted document editor functions in any suitable form (e.g., a list, a non-empty set, etc.). In examples described herein, configurable document editor functions not specified by a given device policy as permitted to be included in a document editor are not permitted to be included in a document editor requested in relation to a computing device type associated with the given device policy (e.g., when the computing device type is directly or indirectly indicated in the request for the document editor). In such examples, the document editor functions not specified may be excluded (or prevented from inclusion) in the document editor requested by the user. Such exclusion may be performed by engine 228, for example.

In such examples, in response to request 280, device engine 226 may determine a second plurality of document editor functions permitted to be included in a document editor for the specified computing device type and the target document type. For example, in response to request 280, engine 226 may determine a target device policy 244A based on computing device type information 282 of request 230. Target device policy 244A may specify a second plurality of document editor functions (e.g., configurable document editor functions), represented in FIG. 2 by functions labeled "1", "2", "3", "B", and "C". In some examples, the second plurality may specify more or fewer document editor functions.

In some examples, engine 228 may generate document editor 290 comprising a third plurality of document editor functions that are included in both the first and second pluralities of document editor functions, as described above in relation to FIG. 1. In such examples, the third plurality may exclude configurable document editor functions that are excluded from either (or both) of the first and second pluralities (i.e., excluded from one or both of target role policy 242A and target device policy 244A). In some examples, a template engine 230 of engine 228 may create a document editor template specifying the third plurality of (configurable) document editor functions. For example, in the example of FIG. 2, engine 230 may generate a document editor template 231 specifying the third plurality of document editor functions comprising at least document editor functions represented by FIG. 2 labels "B", "C", and "1", for example, which are common between target role policy 242A and target device policy 244A. Document editor functions represented by "A" and "3", for example, are excluded from at least one of target role policy 242A and target device policy 244A, and as such are excluded by engine 230 from template 231. As an example, the document editor function labeled "3" may be a function to e-mail a document to a recipient. In such examples, target device policy 244A may include the e-mail document editor function (e.g., the function labeled "3"), indicating that the device type specified by information 282 (e.g., a PC, tablet, etc.) is permitted to have the e-mail document editor function. In some examples, the target user may not be permitted to have the e-mail document editor function based on the target user's assigned role in the enterprise. In such examples, the e-mail document editor function (e.g., the function labeled "3"), may be excluded from target role policy 242A for the role assigned to the target user. In such examples, engine 230 may exclude the e-mail document editor function (i.e., the function labeled "3"), from template 231 since it is not specified by both target role policy 242A and target device policy 244A. In such examples, the target device policy 244A specifying the e-mail document editor function does not override the exclusion of the e-mail document editor function from the target role policy 242A. In other examples, users assigned to another role may be permitted to have the e-mail function. In such examples, the role policy for that role may specify the e-mail document editor function, and the function may be specified in template 231 when it is specified in both the target role and device policies. Although three document editor functions are illustrated in template 231 in the example of FIG. 2, template 231 may specify more or fewer document editor functions.

In the example of FIG. 2, editor engine 232 may actively or passively acquire template 231 from engine 230 and generate document editor 290 based on template 231 using information acquired from function repository 250. As described above in relation to FIG. 1, each configurable document editor function corresponds to a respective collection of information implementing the document editor function. In the example of FIG. 2, function repository 250 of system 200 may store, for each configurable document editor function, the corresponding collection of information implementing the document editor function. Function repository 250 may be at least one machine-readable storage medium of system 200, remote from but accessible to system 200, or a combination thereof. In some examples, some or all of the information implementing core document editor functions may be stored in repository 250. In some examples, the information implementing core document editor functions may be stored in whole or in part in repositor(ies) remote from but accessible to system 200.

In the example of FIG. 2, engine 232 may access the implementing information for each of the configurable document editor functions specified in template 231, and implementing information for core document editor functions for the specified computing device type and document type (e.g., as indicated by request 280), and may dynamically assemble together the accessed implementing information for the core and configurable document editor functions to generate executable document editor 290 including the document editor functions specified in template 231 (e.g., at least those represented as "B", "C", and "1", for example) and excluding (configurable) document editor functions that are excluded from template 231 (and from either of target policies 242A and 244A).

After document editor 290 is generated by generation engine 228 (e.g., by editor engine 232), provision engine may provide the generated document editor 290 to computing device 262 of the target user (e.g., via a computer network such as the Internet). In the example of FIG. 2, the dynamically generated document editor 290 may be executable by computing device 262. For example, engine 228 may generate document editor 290 such that it is executable by a web browser of computing device 262.

As noted above, policy repository 240 may include a plurality of user profiles 246. In such examples, each user profile of the plurality of user profiles 246 may be associated with a different user in the enterprise and may specify a respective plurality of document editor functions to be excluded from a document editor for the target document type generated for the associated user. The associations between users and user profiles may be represented and stored in any suitable format (e.g., a mapping, etc.) on or remote from but accessible to system 200, or a combination thereof. Each user profile may specify functions in any suitable form (e.g., a list, a non-empty set, etc.).

In some examples, in response to request 280, profile engine 227 may determine which of the plurality of user profiles 246 is associated with the target user in the enterprise. In the example of FIG. 2, engine 227 may determine that target user profile 246A is associated with the target user in the enterprise, based on target user information 281 in request 280. Target user profile 246A may specify a fourth plurality of (configurable) document editor functions to be excluded from a document editor for the target document type when generated for the target user (e.g., functions labeled "D", "2", "6", "7", and "9" in FIG. 2). Although one user profile 246A is illustrated in the example of FIG. 2, the plurality of user profiles 246 may include other user profiles. In the example of FIG. 2, at least some of the document editor functions of the fourth plurality specified by target user profile 246A are not specified in other user profile(s) associated with other user(s).

In such examples, engine 228 may determine the third plurality of document editor functions such that the third plurality of document editor functions excludes each document editor function specified in target user profile 246A (i.e., specified in the fourth plurality of document editor functions). In such examples, engine 223 may determine the third plurality to include configurable document editor functions included in both target role policy 242A and target device policy 244A (e.g., the intersection of policies 242A and 244A), and to exclude each of the configurable document editor functions specified in target user profile 246A. In the example of FIG. 2, generation engine 228 may determine the intersection to include at least the functions labeled "B", "C", "1" and "2" in FIG. 2. Based on the inclusion of the function labeled "2" in target user profile 246A, engine 228 may further determine to exclude the function labeled "2" from the third plurality. In such examples, template engine 230 may generate template 231 to specify functions labeled "B", "C", and "1", and excluding functions excluded from either of policies 242A and 244A, and excluding functions specified in target user profile 246A. In such examples, engine 232 may generate document editor 290 including functions specified by the profile (e.g., including functions labeled "B", "C", and "1" in FIG. 2.), and engine 229 may provide the document editor 290 to computing device 262. In some examples, functionalities described herein in relation to FIG. 2 may be provided in combination with functionalities described herein in relation to any of FIGS. 1 and 3-4.

Figures 3, 4:
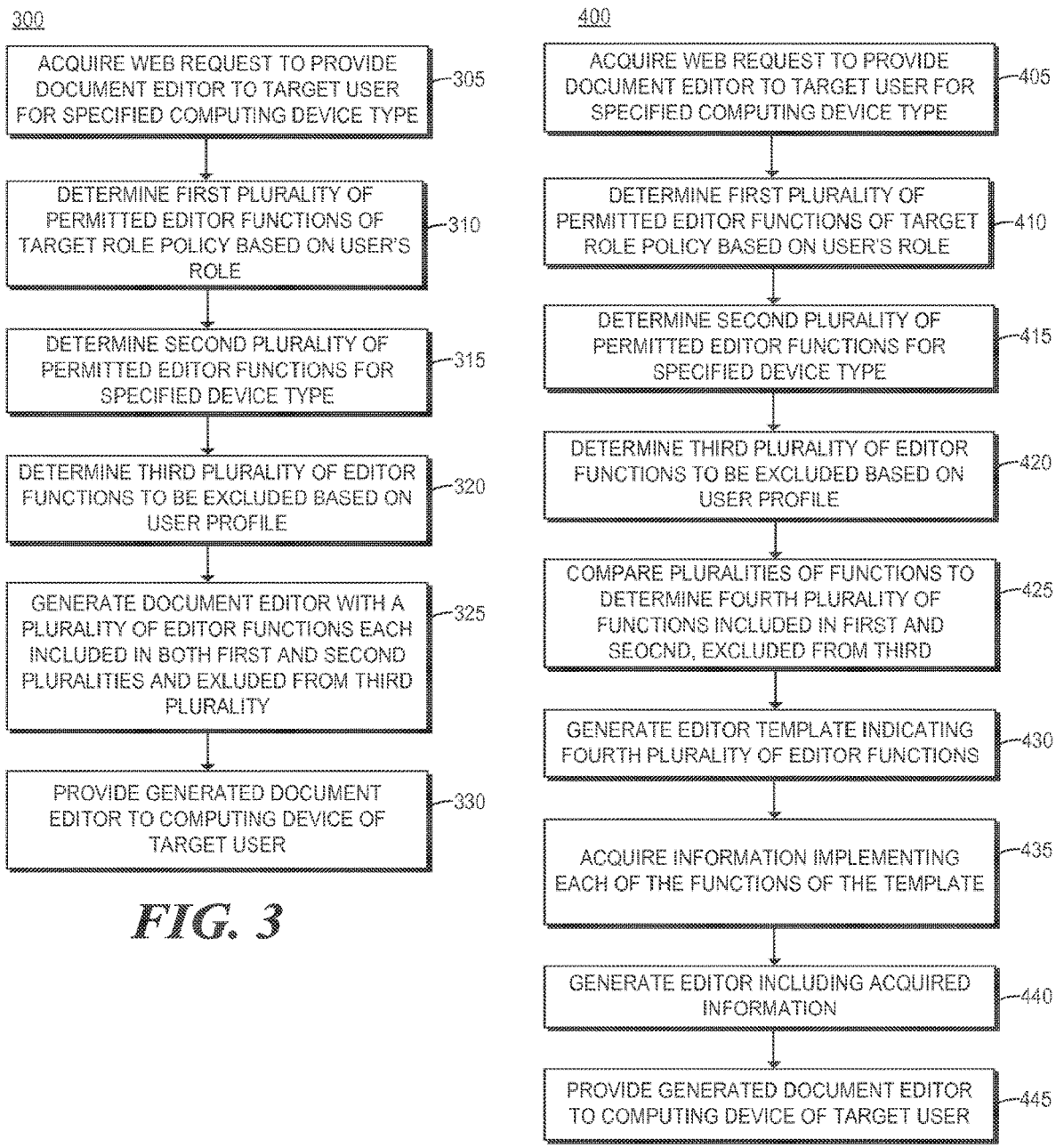
FIG. 3 is a flowchart of an example method for generating a document editor with a plurality of editor functions determined based on a role policy, device type, and user profile.
FIG. 4 is a flowchart of an example method for generating a document editor including acquired machine-readable instructions.

FIG. 3 is a flowchart of an example method 300 for generating a document editor with a plurality of editor functions determined based on a role policy, device type, and user profile. Although execution of method 300 is described below with reference to system 200 of FIG. 2 described above, other suitable systems for the execution of method 300 can be utilized (e.g., computing device 100). Additionally, implementation of method 300 is not limited to such examples.

At 305 of method 300, engine 222 may actively or passively acquire a web request 280 to provide a specified target user a document editor for a target document type and a specified computing device type. At 310, in response to request 280, engine 224 may determine, with a processing resource (e.g., a processing resource of engine 224) and based on a role assigned to the target user in an enterprise, a target role policy 242A for the target user among a plurality of role policies 242. In some examples, the target role policy 242A specifies a first plurality of document editor functions. Each role policy of the plurality of role policies 242 is associated with a different role for the enterprise and specifies a different plurality of document editor functions permitted to be included in a document editor for the target document type and for a user assigned to the associated role.

At 315, engine 226 may determine a second plurality of document editor functions permitted in a document editor for the target document type when generated for the specified computing device type. At 320, engine 227 may determine a third plurality of document editor functions to be excluded from a document editor for the target document type when generated for the target user.

At 325, engine 228 may generate a document editor 290 comprising a fourth plurality of document editor functions, each included in both the first and second pluralities of document editor functions and excluded from the third plurality of document editor functions. Engine 228 may generate document editor 290 as described above. At 330, engine 229 may provide the generated document editor 290 to a computing device 282 of the target user via a computer network.

Although the flowchart of FIG. 3 shows a specific order of performance of certain functionalities, method 300 is not limited to that order. For example, the functionalities shown in succession in the flowchart may be performed in a different order, may be executed concurrently or with partial concurrence, or a combination thereof. In some examples, functionalities described herein in relation to FIG. 3 may be provided in combination with functionalities described herein in relation to any of FIGS. 1-2 and 4.

FIG. 4 is a flowchart of an example method 400 for generating a document editor including acquired machine-readable instructions. Although execution of method 400 is described below with reference to system 200 of FIG. 2 described above, other suitable systems for the execution of method 400 can be utilized (e.g., computing device 100). Additionally, implementation of method 400 is not limited to such examples. Method 400 is described below with reference to example of FIG. 2.

At 405 of method 400, engine 222 may actively or passively acquire a web request 280 to provide a specified target user a document editor for a target document type and a specified computing device type. At 410, in response to request 280, engine 224 may determine, with a processing resource (e.g., a processing resource of engine 224) and based on a role assigned to the target user in an enterprise, a target role policy 242A for the target user among a plurality of role policies 242. In some examples, the target role policy 242A specifies a first plurality of document editor functions. Each role policy of the plurality of role policies 242 is associated with a different role for the enterprise and specifies a different plurality of document editor functions permitted to be included in a document editor for the target document type and for a user assigned to the associated role.

At 415, engine 226 may determine a second plurality of document editor functions permitted in a document editor for the target document type when generated for the specified computing device type. At 420, engine 227 may determine a third plurality of document editor functions to be excluded from a document editor for the target document type when generated for the target user.

At 425, engine 228 may compare the first, second, and third pluralities of document editor functions to determine the fourth plurality of document editor functions, wherein each function of the fourth plurality is included in both the first and second pluralities of document editor functions and excluded from the third plurality of document editor functions. At 430, engine 230 may generate an editor template 231 specifying the fourth plurality of document editor functions. At 435, engine 232 may acquire information, including machine-readable instructions, implementing each of the document editor functions specified by the generated editor template 231. At 440, editor engine may generate document editor 290 using the acquired information, as described above. At 445, engine 229 may provide the generated document editor 290 to a computing device 262 of the target user via a computer network.

Although the flowchart of FIG. 4 shows a specific order of performance of certain functionalities, method 400 is not limited to that order. For example, the functionalities shown in succession in the flowchart may be performed in a different order, may be executed concurrently or with partial concurrence, or a combination thereof. In some examples, functionalities described herein in relation to FIG. 4 may be provided in combination with functionalities described herein in relation to any of FIGS. 1-3. All of the features disclosed in this specification (including any accompanying claims, abstract and drawings), and/or all of the steps of any method or process so disclosed, may be combined in any combination, except combinations where at least some of such features and/or steps are mutually exclusive.

The invention claimed is:

1. A non-transitory machine-readable storage medium comprising instructions executable by a processing resource to:
   acquire, from a computing device of a target user, a request to provide the target user a document editor for a target document type;
   in response to the request, determine a role policy associated with the target user based on a role assigned to the target user in an enterprise the role policy specifying a document editor function permitted to be included in a document editor for the target document type when requested by a user assigned to the associated role;
   dynamically generate the document editor in response to the request, the document editor comprising the document editor function specified by the role policy, wherein dynamically generating the document editor comprises accessing a function repository storing implementing information for the document editor function to obtain the implementing information for the document editor function and assembling together the implementing information for the document editor function to dynamically generate the document editor; and
   provide the generated document editor in response to the request.

2. The storage medium of claim 1, wherein the generated document editor is executable by a web browser of the computing device.

3. The storage medium of claim 1, wherein:
   the request identifies the target user and a document of the target document type to be edited in the document editor; and
   the request is a web request generated by a web browser of the computing device.

4. The storage medium of claim 3, wherein:
   the request further identifies a computing device type of the computing device of the target user;
   the instructions comprise instructions to determine a second document editor function permitted in the document editor for the specified computing device type and the target document type wherein the second document editor function is not specified in the role policy.

5. The storage medium of claim 4, wherein the instructions further comprise instructions to:
   in response to the request, determine which of a plurality of device policies is associated with the identified computing device type in the enterprise, each of the device policies being associated with a different computing device type and specifying a different plurality of document editor functions permitted to be included in a document editor for the target document type when generated for the associated computing device type.

6. The storage medium of claim 4, wherein:
   the instructions comprise instructions to determine a third document editor function to be excluded from the document editor for the target document type when generated for the target user.

7. A system comprising:
   a processor; and
   a non-transitory computer readable medium comprising instructions to:
   acquire, from a computing device of a target user, a request to provide the target user a document editor for a target document type;
   in response to the request, determine a role policy associated with the target user based on a role assigned to the target user in an enterprise the role policy specifying a document editor function permitted to be included in a document editor for the target document type when requested by a user assigned to the associated role;
   dynamically generate the document editor in response to the request, the document editor comprising the document editor function specified by the role policy, wherein dynamically generating the document editor comprises accessing a function repository storing implementing information for the document editor function to obtain the implementing information for the document editor function and assembling together the implementing information for the document editor function to dynamically generate the document editor; and
   provide the generated document editor in response to the request.

8. The system of claim 7, wherein the generated document editor is executable by a web browser of the computing device.

9. The system of claim 7, wherein:
   the request identifies the target user and a document of the target document type to be edited in the document editor; and
   the request is a web request generated by a web browser of the computing device.

10. The system of claim 9, wherein:
    the request further identifies a computing device type of the computing device of the target user; and
    the instructions comprise instructions to determine a second document editor function permitted in the document editor for the specified computing device type and the target document type wherein the second document editor function is not specified in the role policy.

11. The system of claim 10, wherein the instructions further comprise instructions to:
    in response to the request, determine which of a plurality of device policies is associated with the identified computing device type in the enterprise, each of the device policies being associated with a different computing device type and specifying a different plurality of document editor functions permitted to be included in a document editor for the target document type when generated for the associated computing device type.

12. The system of claim 10, wherein:
    the instructions comprise instructions to determine a third document editor function to be excluded from the document editor for the target document type when generated for the target user.

13. A method comprising:
    acquiring, from a computing device of a target user, a request to provide the target user a document editor for a target document type;
    in response to the request, determining a role policy associated with the target user based on a role assigned to the target user in an enterprise the role policy specifying a document editor function permitted to be included in a document editor for the target document type when requested by a user assigned to the associated role;

dynamically generating the document editor in response to the request, the document editor comprising the document editor function specified by the role policy, wherein dynamically generating the document editor comprises accessing a function repository storing implementing information for the document editor function to obtain the implementing information for the document editor function and assembling together the implementing information for the document editor function to dynamically generate the document editor; and providing the generated document editor in response to the request.

14. The method of claim 13, wherein the generated document editor is executable by a web browser of the computing device.

15. The method of claim 14, wherein:

the request further identifies a computing device type of the computing device of the target user, and the method further comprises determining a second document editor function permitted in the document editor for the specified computing device type and the target document type wherein the second document editor function is not specified in the role policy.

16. The method of claim 15, further comprising:

in response to the request, determine which of a plurality of device policies is associated with the identified computing device type in the enterprise, each of the device policies being associated with a different computing device type and specifying a different plurality of document editor functions permitted to be included in a document editor for the target document type when generated for the associated computing device type.

17. The method of claim 15, further comprising:

determining a third document editor function to be excluded from the document editor for the target document type when generated for the target user.

18. The method of claim 13, wherein:

the request identifies the target user and a document of the target document type to be edited in the document editor; and the request is a web request generated by a web browser of the computing device.

* * * * *